United States Patent [19]
Fishback

[11] 3,990,572
[45] Nov. 9, 1976

[54] PACKAGING MACHINE AND METHOD
[75] Inventor: Alton J. Fishback, Austell, Ga.
[73] Assignee: The Mead Corporation, Dayton, Ohio
[22] Filed: Dec. 19, 1975
[21] Appl. No.: 642,658

[52] U.S. Cl. .................................. 198/458; 53/48; 198/419; 198/728
[51] Int. Cl.² ...................................... B65G 47/26
[58] Field of Search ................... 198/29, 30, 32, 34, 198/168, 160, 175; 53/48

[56] References Cited
UNITED STATES PATENTS

| | | | |
|---|---|---|---|
| 2,247,673 | 7/1941 | Thum | 198/32 X |
| 2,247,692 | 7/1941 | Papendick | 198/32 X |
| 2,247,694 | 7/1941 | Papendick | 198/32 X |
| 2,247,698 | 7/1941 | Papendick | 198/32 X |
| 2,484,222 | 10/1949 | Hauswald | 198/168 X |
| 2,968,898 | 1/1961 | Hickin | 53/48 X |
| 3,007,293 | 11/1961 | McGihon | 53/48 X |
| 3,084,783 | 4/1963 | Morton et al. | 198/32 X |
| 3,225,510 | 12/1965 | Jones et al. | 53/48 |
| 3,409,115 | 11/1968 | Porcaro | 198/32 X |
| 3,774,748 | 11/1973 | Dederer et al. | 198/32 |

*Primary Examiner*—Evon C. Blunk
*Assistant Examiner*—Richard K. Thomson
*Attorney, Agent, or Firm*—Walter M. Rodgers; Walter A. Rodgers

[57] ABSTRACT

A packaging machine having spaced parallel flight bars movable in such manner as to engage and push groups of articles through the machine is provided with guide means for diverting the direction of movement of the articles in a direction transverse to the path of movement thereof and is also provided with cam controlled pusher blocks slidably mounted on the flight bars and arranged to engage the rearmost article in one row of articles so as to push that row of articles ahead relative to the other row of articles and by this means to maintain the group of articles in a substantially rectilinear arrangement thereby to prevent inadvertent dislodgment of partitioning inserts disposed within the article group such as might be caused by undue racking of the articles from a rectilinear arrangement to the configuration of a rhomboid.

8 Claims, 3 Drawing Figures

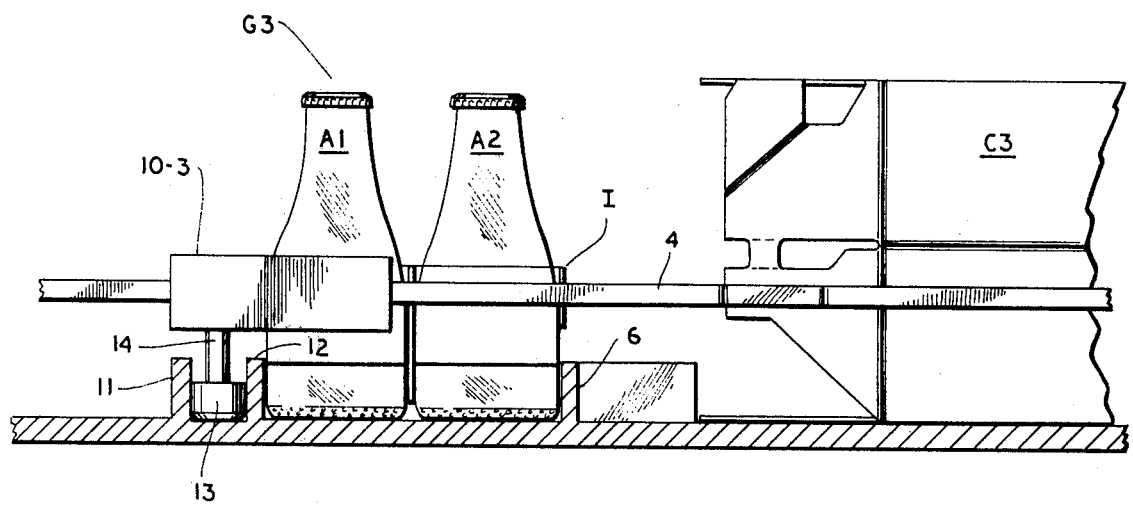
Fig_2
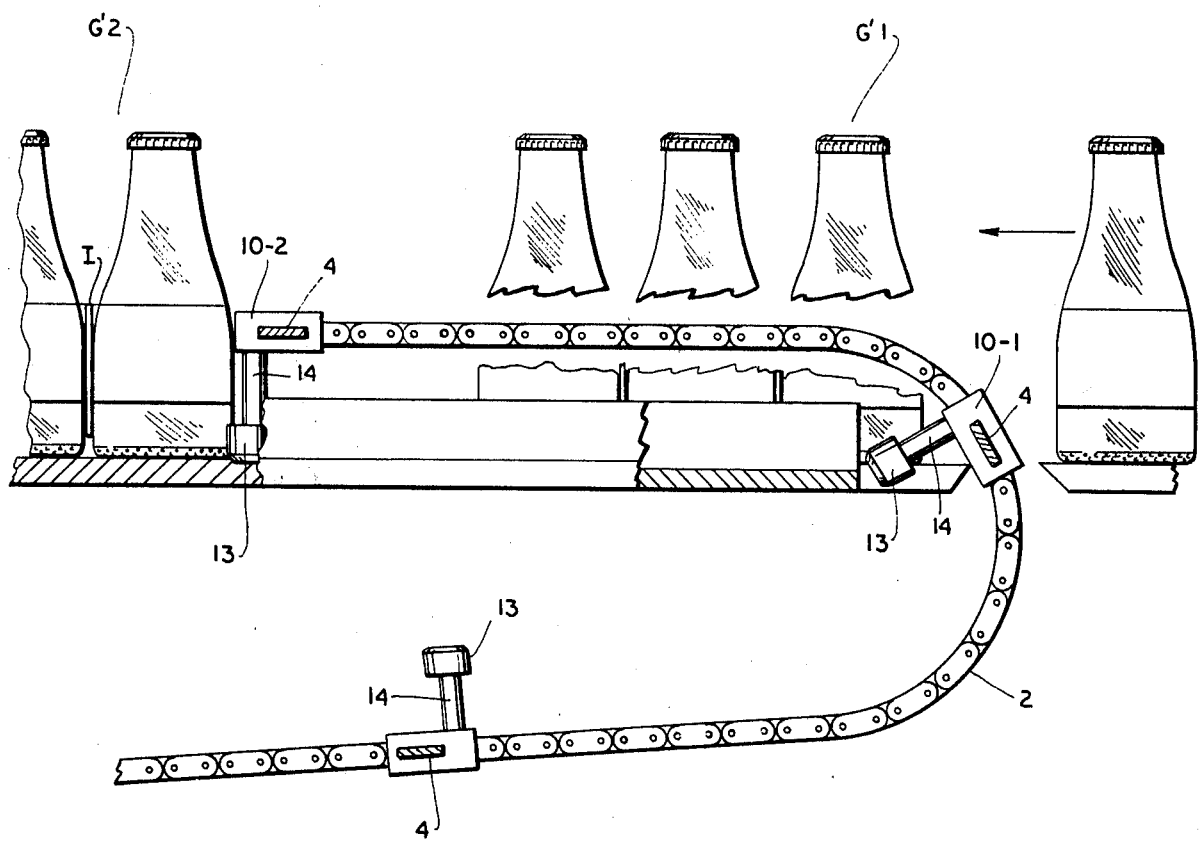
Fig_3

PACKAGING MACHINE AND METHOD

U.S. Pat. No. 3,904,036 issued Sept. 9, 1975 discloses and claims a sleeve-like container which is arranged to be loaded through its open ends and then closed to complete a totally enclosed package.

U.S. Pat. application Ser. No. 632,226 filed Nov. 17, 1975 discloses and claims an insert which is specially adapted for use in conjunction with the groups of articles which are loaded from the opposite open ends of a container such as that disclosed and claimed in the aforementioned patent.

U.S. Pat. application Ser. No. 650,805 filed Jan. 20, 1976 discloses and claims a machine for manipulating an insert into set up condition and for placing the insert into a group of articles before being loaded into a container such as that disclosed in the aforementioned patent.

Groups of articles with their associated inserts in place are moved along a predetermined path on opposite sides of the open ends of the container such as that disclosed and claimed in the aforementioned patent and when so moved are disposed in a rectilinear arrangement. When so arranged, there is little or no tendency for the inserts to become inadvertently dislodged and disassociated from an associated group of articles. The groups of articles must be moved inwardly toward each other and ultimately into the open ends of a container such as that formed according to the aforementioned patent. Since the current practice utilizes spaced parallel flight bars for engaging and moving groups of articles, it is apparent that a diversion by suitable guide means of the direction of movement of the articles inwardly and toward the open ends of the container necessarily shifts the rectilinear arrangement of the articles to that of a rhomboid. Such shifting or racking tends to dislodge the inserts associated with the groups of articles.

According to the present invention groups of articles whose direction of movement is diverted and which initially are disposed in a rectilinear arrangement are maintained in a substantially rectilinear arrangement by suitable cam operated pusher blocks slidably mounted on the flight bars and controlled so that such pusher blocks are moved in behind the rearmost article in one row of articles and by this means such row of articles is pushed ahead relative to the other row of articles and thus is maintained in a rectilinear arrangement while the group is moved transversely by the guide means. At such time as the group of articles is redirected so that there is no transverse movement and by this means conditioned for insertion into the open ends of the container, the pusher means is moved out of contact with the row of articles which has been pushed ahead and such movement of the pusher means allows the flight bar to engage the rearmost article in both rows of articles thus to preserve the rectilinear arrangement and to condition the group for precise and efficient insertion into the container through an open end thereof.

For a better understanding of the invention reference may be had to the following description taken in conjunction with the accompanying drawings in which;

FIG. 2 is a sectional view taken along the line designated 2—2 in FIG. 1 and in which FIG. 3 is a sectional view with certain elements broken away for clarity.

Figure 1:
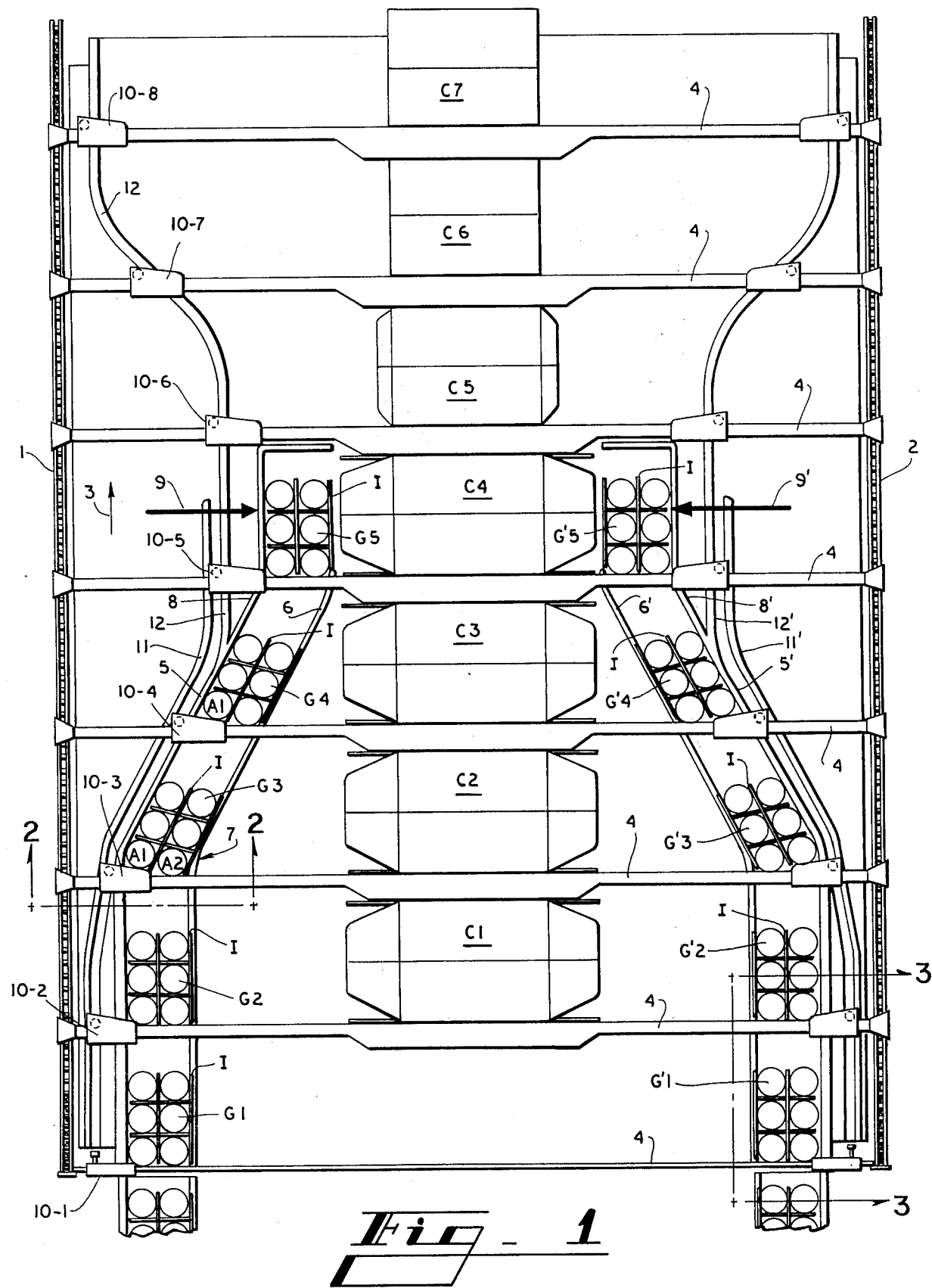
FIG. 1 is a plan view of a packaging machine constructed according to the invention.

With reference to the drawings and particularly with reference to FIG. 1, the numerals 1 and 2 are used to designate the working reach of a pair of endless elements which are mounted in known manner about sprockets in such manner that driven sprockets impart movement to the working reaches of the endless elements 2 which is in the direction of the arrow designated by the numeral 3. Secured to endless elements 1 and 2 in known manner are a plurality of flight bars designated by the numeral 4. As is well known, flight bars 4 engage groups of articles such as are designated G1, G2, G3, G4 and G5 and serve to impart movement thereto which is in the general direction indicated by the arrow 3. Each group of articles is provided with a partitioning insert designated by the letter I. The groups of articles shown on the right side of FIG. 1 are indicated by designations which are similar to those used in connection with the groups of articles on the left side of FIG. 1 except that the right side articles are designated as G' with a numeral which corresponds to that used on the left side of FIG. 1.

Transverse movement of the groups of articles is controlled on the left side of the machine by guide means in the form of guides 5 and 6. Similar guides 5' and 6' are associated with the groups of articles on the right side of the machine. As is apparent in FIG. 1 guides 5 and 6 change direction at the point designated at 7 and thus divert the direction of movement from the rectilinear group of articles such as that designated at G2 in a direction toward the right. Such diversion of movement is to condition each group of articles for subsequent insertion into the open end of the sleeve-like container designated at C4. Of course the direction of movement of the group of containers such as is designated at G4 must be redirected so as to cause the group to occupy the position and orientation designated at G5. Such redirection is effected by the guides 5 and 6 due to the change of direction of those guides at the point generally indicated by he numeral 8. With the group of articles disposed as indicated at G5, suitable pusher means schematically represented by the arrow 9 is moved transversely inward toward the open ended container C4 and moves the group of articles into the container along with its associated insert I. In like fashion a group of articles disposed at the other end of the container C4 and designated at G'5 is moved inwardly along with its associated insert I by the means designated 9'.

Since the change of direction of movement of a group of articles such as that designated at G2 which is effected by the change of direction of the guides 5 and 6 at the point generally designated at 7 tends to force the articles from a rectilinear arrangement at G2 into the configuration of a rhomboid due to the fact that the rearmost article such as A1 and A2 are normally disposed in engagement with a flight bar 4. In order to maintain the group of articles at position G3 in a rectilinear arrangement and in accordance with this invention pusher means in the form of pusher blocks are slidably mounted on the flight bars 4 and are controlled by suitable cam means so as to cause the pusher block such as that designated 10-2 to move in behind the article A1 as the direction of movement of the article group is changed at point 7 from that indicated at G2 to that represented at G3. As is apparent from FIG. 1 group G2 by virtue of pusher block 10-2 is disposed in a rectilinear arrangement and when so disposed the associated partitioning insert I has very little if any tendency to become inadvertently dislodged from its associated article group.

As is apparent from FIG. 1, a pusher block at position 10-3 remains behind article A1 until position 8 is reached at which point the pusher block at position 10-5 has been moved toward the left.

Movement of the pusher blocks is controlled by fixed cam means which comprises a pair of cam guides designated by the numerals 11 and 12 in which a cam follower 13 mounted on a pin 14 is arranged to ride.

As is apparent particularly from FIG. 1 the cam guides 11 and 12 generally parallel the path of movement of the groups of articles until a point adjacent group G4 is reached at which time these guides change direction and move outwardly so as to initiate the gradual disengagement of pusher block 10-4 from article A1 so that when the group G4 arrives at the position designated G5, the group is in a rectilinear arrangement and during the change of direction the rectilinear pattern is substantially maintained due to the gradual disengagement of the pusher block beginning at the position designated 10-4. When disposed at position 10-5, the article group is ready for insertion by schematic operating means 9 into the left hand end of container C4. Of course similar but opposite operations are effected on the other side of the machine so that the pusher means 9' simultaneously effects loading of the group G'5 through the right hand end of the sleeve type carton C4. Of course when loading is complete the carton end flaps are closed by means not shown as indicated at C5, C6 and C7 and pusher blocks move outwardly as indicated at 10-6 and 10-7 due to the cam 12.

The embodiments of the invention in which an exclusive property or privilege is claimed are defined as follows:

1. A packaging machine comprising a flight bar disposed astride the path of movement of a group of substantially noncompressible articles arranged in at least two rows in a rectilinear arrangement, means for moving said flight bar in the general direction of the path of movement of the articles while in engagement with the rear article in each row of the group of articles to impart movement to each row of articles, guide means arranged to divert the group of articles from movement in said general direction to cause the rows of articles to move in aligned relation in a direction which is angularly disposed to said general direction while movement is imparted to the group of articles by said flight bar, pusher means slidably mounted on said flight bar, and cam means disposed adjacent said path of movement and engageable with a part of said pusher means for moving said pusher means along said flight bar and behind only one row of articles as the direction of movement is diverted so as to move only said one row of articles relative to the other row and in the direction which is angularly disposed relative to said general direction thereby to maintain the article group in a substantially rectilinear arrangement.

2. A machine according to claim 1 wherein said guide means is arranged to redirect movement of the group of articles in a direction along said path of movement and wherein said cam means is arranged to move said pusher means along said flight bar from behind said one row of articles as the direction of movement of the articles is redirected.

3. A machine according to claim 2 wherein said cam means is arranged to move said pusher means in a direction away from said path of movement following redirection of movement of the group of articles.

4. A machine according to claim 1 wherein the article group is diverted in a direction such that the row of articles behind which said pusher means moves is in following relation to the component of movement of the other row of articles in a direction which is transverse to said path of movement.

5. A machine according to claim 1 wherein said part of said pusher means comprises a cam follower mounted on and movable with said pusher means.

6. A packaging machine comprising a pair of spaced apart movable endless elements having generally parallel working reaches, a plurality of flight bars spaced apart and arranged with their ends secured to said endless elements respectively in such manner that said flight bars are parallel to each other, each flight bar being engageable with two transversely spaced groups of articles to impart movement thereto along a predetermined path, each such group including two rows of articles normally disposed in a rectilinear arrangement and the rear article in each row being engageable by a flight bar to move the rows of each group along said predetermined path, guide means disposed alongside each article group and configured to impart transverse movement to said groups of articles so as to cause the groups to move inwardly toward each other while being moved by the associated flight bar, a pair of pusher blocks slidably mounted on each flight bar, and cam means engageable with a part of each pusher block for imparting inward sliding movement thereto so as to cause said pusher blocks to move behind only the rearmost article in the outer row of each article group as the article groups move transversely inward thereto to maintain the article groups in a generally rectilinear arrangement.

7. A machine according to claim 6 wherein said guide means is configured to arrest inward movement of said article groups after predetermined inward movement and to redirect movement of the article groups along said predetermined path and wherein said cam means is configured to cause said pusher blocks to move transversely outward and out of engagement with the rearmost article in the outer rows of articles as inward movement of the article groups is arrested thereby to maintain the article groups in substantially rectilinear arrangement.

8. A method of controlling the configuration of a moving group of articles arranged in at least two rows of at least two articles each during a change in the direction of movement of the articles comprising simultaneously engaging the rearmost articles in both rows and imparting a force to cause the rows to move in one general direction and with the articles arranged in a generally rectilinear configuration, imparting a force to only one row of articles to divert the direction of movement of the group of articles, and engaging the rearmost article in said one row of articles and imparting a force thereto to cause said one row of articles to move in the diverted direction relative to the other row of articles thereby to maintain the group of articles in a substantially rectilinear configuration.

* * * * *